United States Patent [19]

Thomsen

[11] Patent Number: 4,921,230
[45] Date of Patent: May 1, 1990

[54] SPIRAL WOUND SPRING RETENTION CLIP

[75] Inventor: H. Jay Thomsen, 10600 Gratiot, Detroit, Mich. 48213

[73] Assignee: H. Jay Thomsen, Detroit, Mich.

[21] Appl. No.: 322,576

[22] Filed: Mar. 13, 1989

[51] Int. Cl.5 .............................................. F16F 1/10
[52] U.S. Cl. .................................................. 267/156
[58] Field of Search ............... 267/155, 156, 157, 182, 267/275

[56] References Cited

U.S. PATENT DOCUMENTS 180,644 8/1876 Sabin .................................... 267/156
1,923,459 8/1933 Riblet .................................... 268/126
2,698,509 1/1955 Van Valkenburgh et al. .... 267/155 X
2,797,431 7/1957 Loria ................................ 267/156 X

FOREIGN PATENT DOCUMENTS 335154 12/1958 Switzerland ......................... 267/156
139050 2/1920 United Kingdom .

Primary Examiner—Duane A. Reger
Attorney, Agent, or Firm—Harness, Dickey & Pierce

[57] ABSTRACT

A retention clip includes a force applying member which retains a spirally wound spring in a substantially concentric condition.

9 Claims, 2 Drawing Sheets

RELEVANT ART 4,921,230

SPIRAL WOUND SPRING RETENTION CLIP

BACKGROUND OF THE INVENTION

The present invention relates to retention clips and, more particularly, to clips which retain spirally wound springs in substantially concentric shapes.

Ordinarily, spiral or clock wound springs are manufactured from windings of flat wire material. These types of springs generally having unrolled lengths of between 10 to 50 inches providing the spring with several coils. These types of springs may be used as counterbalances for car door windows, hood or truck assists.

In use, these spiral wound springs are forced to one side and pack in a nonconcentric position as illustrated in FIG. 1. In this position, the coils contact one another to create a source of inner coil friction build-up. If the friction build-up continues to build reaching a high energy level before it is released, a racheting of the coils or noise generally results. Especially in a noise amplifying situation, like a car door, the noise is very obtrusive and unwanted.

It is desirous to have a spiral or clock wound spring which is in a substantially concentric condition during use and nonuse conditions. Thus, there is a need in the field for a device which retains the coils of the spiral springs in substantially concentric positions.

Accordingly, the present invention provides the art with such a device. The present invention provides a force on the outermost wind or coil of the spiral spring to retain the spiral spring in a substantially concentric condition. Also, by providing a concentric condition, coil contact is minimized if not eliminated. This lack of contact reduces the friction between the coils to substantially eliminate the noise associated with rubbing of adjacent coils.

By providing spiral springs in concentric positions with substantially equal distance spaces between adjacent coils, the cost of finishing the spiral springs may be reduced. By having an equal space between adjacent coils, the spiral spring may be coated with a finish coating for appearance or rust prevention while the spring is in its coiled concentric assembled condition. This is unlike current finishing techniques which require the spring to be finished in an unloaded condition prior to assembly of the spiral spring. Also, the entire spiral spring may be coated in its spiral concentric condition after it has been positioned within a vehicle door or the like.

From the subsequent detailed description taken in conjunction with the appended drawings and subjoined claims, other objects and advantages of the present invention will become apparent to those skilled in the art.

DETAILED DESCRIPTION OF THE PREFERRED EMBODIMENT

Figure 1:
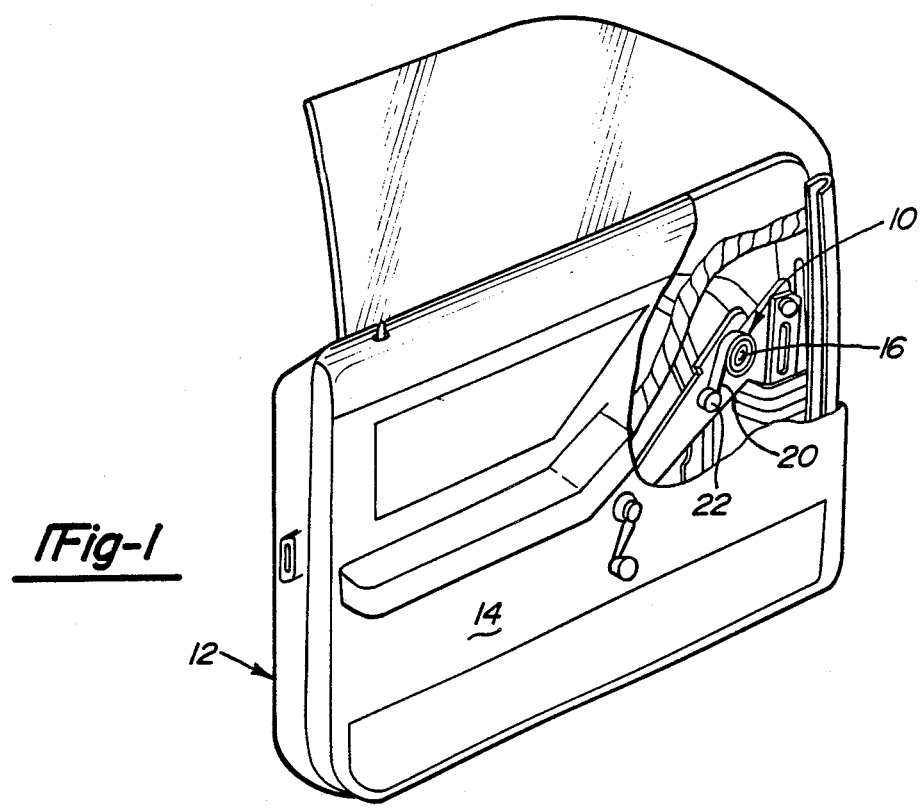
FIG. 1 is an elevational view of a relevant art spring.
Figure 2:
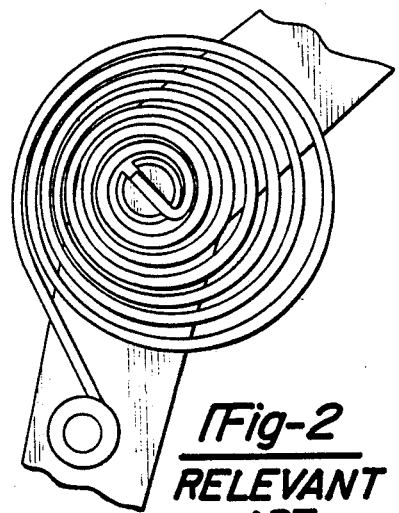
FIG. 2 is a perspective view partially in cross-section of a vehicle door including a spring and clip in accordance with the present invention.
Figure 3:
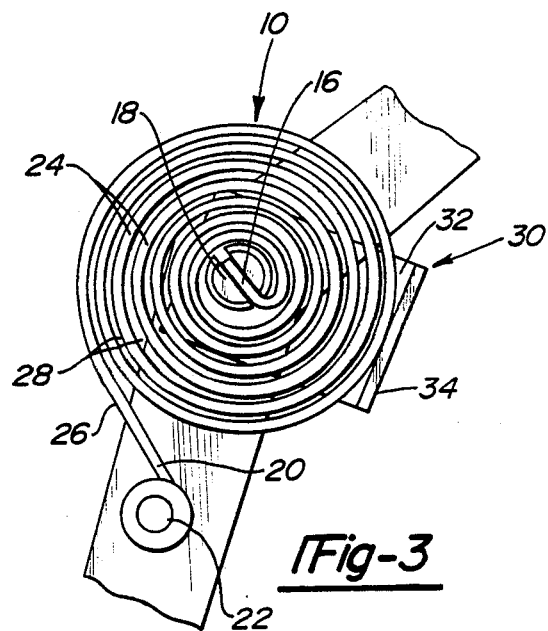
FIG. 3 is an elevational view of a clip and spring in accordance with the present invention.

Turning to the figures, particularly FIGS. 2 and 3, the clip of the present invention is illustrated with a spiral coil spring 10. The spiral coil spring 10 may be used as a counterbalance or the like in a vehicle window system. Generally, the spring is positioned within a door 12 and is concealed from view by a door panel 14. The spring 10 is secured to a support at its inner end 16 at the center of the coils by a pin 18. The outer end 20 of the spring 10 is also secured by a pin 22 to a support. Thus, the spring coils and uncoils in response to the movement of a window or the like to provide counterbalancing characteristics.

The clip 30 generally includes a first member 32 and second member 34. The first member 32 is positioned with respect to the spring 10 such that the individual coils 24 rest on the first member 32. The second member 34 is generally positioned to abut the outermost coil 26 of the spring 10 to maintain the coils 24 and 26 in a concentric position. The second member 34 exerts a desired force unto the outer coil 26 to maintain the spring 10 in its concentric position with equal distance spaces 28 formed between each adjacent coil 24.

Figure 4A:
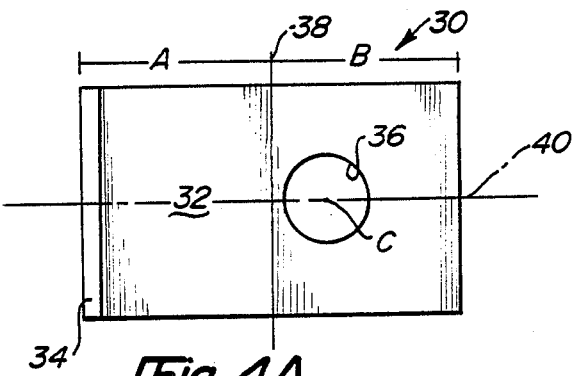
FIG. 4 is a top plan view of a clip in accordance with the present invention.
FIG. 4B is a side elevational view of the clip of FIG. 4A.
Figure 4B:
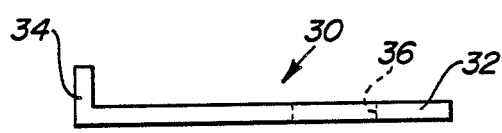

Turning to FIGS. 4A and B, the clip 30 is generally formed from a metallic material, however, plastic or the like materials may be utilized. Generally, the first member 32 is flat, planar and has an overall rectangular shape. The first member 32 generally includes an aperture 36 in which pin 18 is disposed to couple the clip 30 with the spring 10. The aperture 36 is offset with respect to the lateral or minor axis 38 such that the aperture 36 is in the half of the member 32 furthest from the second member 34. Generally, the aperture 36 is centered on the major axis 40. The second member 34 projects from the first member 32 in a plane substantially transverse to the plane of the first member 32. The clip 30 is unitarily formed or stamped and generally has an L-shape when viewed from the side elevation.

Figure 5A:
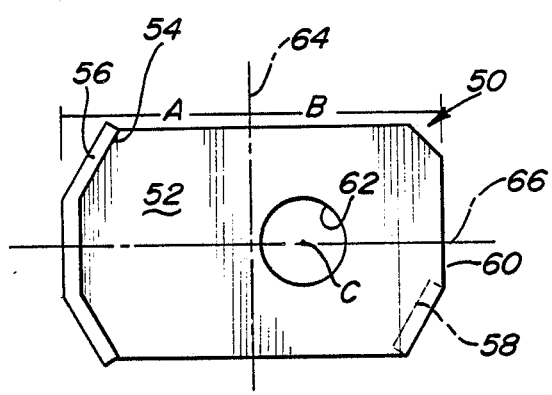
FIG. 5 is a top plan view of another embodiment of a clip in accordance with the present invention.
FIG. 5B is a side elevational view of the clip of FIG. 5A.
Figure 5B:
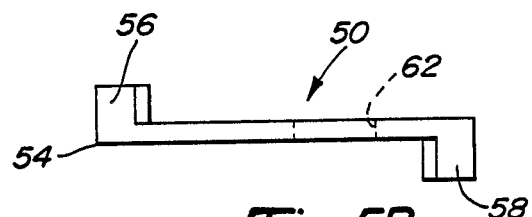

Moving to FIGS. 5A and 5B, a second embodiment of the present invention is illustrated. The clip 50 includes a first flat planar member 52 having an overall rectangular shape. An aperture 62 is disposed in the first member 52. The center of the aperture 62 is offset with respect to the minor axis 64 but is centered substantially on the major axis 66. The minor sides of the rectangle are separated into multiple faces. Side 54 is divided into three angular faces each having a poriton of the continuous second member 56 extending therefrom. The second member 56 applies force to the spring 10 and is disposed in a plane substantially transverse to the plane of the first member 52.

A third member 58 projects from one of the faces of said 60. The third member 58 is in a plane substantially transverse to the plane of the first member 52 and projects from the opposite side of the first member 52 with respect to the second member 56. The third member 58 generally is utilized to prevent rotation of the clip 50 when it is retained in position on a window mechanism.

Figure 6:
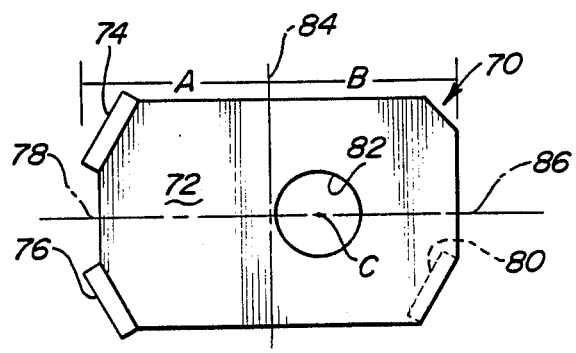
FIG. 6 is a top plan view of another embodiment of a clip in accordance with the present invention.
Figure 6B:
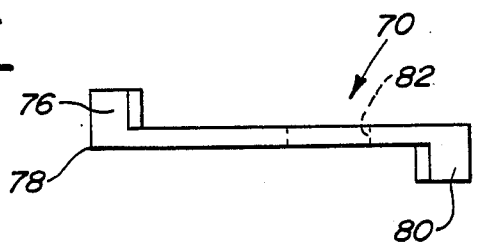
FIG. 6B is a side elevational view of the clip of FIG. 6A.

Turning to FIGS. 6A and 6B, another embodiment of the present invention is illustrated. The clip 70 is similar to that illustrated in FIGS 5A and 5B. The first member 72 is a flat planar member having an overall restangular shape with the minor sides having sdeveral faces. An aperture 84 is disposed in the first member 72. The aperture 84 is off-center with respect to the minor axis 84 and is centered on the major axis 86. A pair of members 74 and 76 which apply force to the spring 10 project from the side 78 of the first member 72 in a plane substantially transverse sto the plane of the first member 72. A fourth member 80 projects from a side 82 of the first member 72 in a plane substantially transverse to the plane of the first member 72 from the opposite side of the first member 72 with respect to the members 74 and 76. The fourth member 80 prevents rotation of the clip when it is secured on the window mechanism.

Generally, the outside distance from the minor side furthest away from the center (C) of the apertures (36, 62 and 82), designated by (A), is at a ratio generally greater than 1 to 1 and is preferably at a ratio of about 2 to 1 to the outside distance of the minor side closest to the center (C) of the apertures (36, 62 and 82) designated by (B).

While the above detailoed description describes the preferred embodiment of the present invention, will be understood that modifications, variations, and alterations may be made to the present invention without deviating from the scope and fair meaning of the subjoined claims.

What is claimed is:

1. A retention claip comprising:
   a first member adapted to be secured adjacent a spiral wound spring such that the first member is adapted to be adjacent several of the winds of the spring;
   a second member adapted for applying a force on the outer most wind of the spiral wound spring so that in use, said second member abuts the outer most wind of the spiral wound spring at all times asserting a force on the outer most wind such that each wind of the spiral wound spring would be substantially concentric with respect to each adjacent wind to provide a substantially equal distance space between adjacent winds.

2. The retention clip according to claim 1 wherein said first member and second member are unitary.

3. The retention clip according to claim 1 wherein said first member is in a plane substantially transverse to a plane of said second member forming an L-shaped structure.

4. The retention clip according to claim 1 wherein said first member being a substantially flat planar overall rectangular member having an aperture, said aperture positioned off-center of a minor axis of said member.

5. A spiral wound spring in combination with a retention clip comprising:
   a spiral wound spring having one or more winds with an inner and outer end, both ends adapted to be stationarily secured;
   said clip including a first member secured adjacent to said spring such that the first member is adjacent several of the winds of said spiral spring;
   a second member abutting the outer most wind of said spiral spring at all times to apply a force on the outer most wind of the spiral spring such that each adjacent wind of the spring is substantially concentric with respect to its adjacent winds to provide a substantially equal distance space between adjacent winds.

6. The retention clip according to claim 5 wherein said first member and second member are unitary.

7. The retention clip according to claim 5 wherein said first member is in a plane substantially transverse to a plane of said second member forming an L-shaped structure.

8. The retention clip according to claim 5 wherein said first member being a substantially flat planar overall rectangular member having an aperture, said aperture positioned off-center side of a minor axis of said member.

9. A retention clip comprising:
   a first member adapted to be secured adjacent a spiral wound spring such that the first member is adapted to be adjacent several of the winds of the spring, said first member being a substantially flat planar overall rectangular member having an aperture, said aperture positioned off-center of a minor axis of said member and dividing the member into two portions, one of said portions of said rectangular member including a minor side farthest away from a center of said aperture a distance form the center of the aperture to the farthest minor side being at a ratio generally greater than 1 to 1 and is preferably at a ratio of about 2 to 1 to a distance from the center of the aperture to a minor side nearest the center of the aperture;
   a second member unitary with said first emmber is adapted for applying a force on the outer most wind of the spiral wound spring at all times, so that in use, said second member abuts the outer most wind of the spiral wound spring asserting a force on the outer most wind such that each wind of the spiral wound spring would be substantially concentric with respect to each adjacent wind to provide a substantially equal distance space between adjacent winds.

* * * * *

UNITED STATES PATENT AND TRADEMARK OFFICE
CERTIFICATE OF CORRECTION

PATENT NO. : 4,921,230

DATED : May 1, 1990

INVENTOR(S) : H. Jay Thomsen

It is certified that error appears in the above-identified patent and that said Letters Patent is hereby corrected as shown below:

Col. 2, line 64, "said" should be --side--.

Col. 3, line 6, "restangular" should be --rectangular--.

Col. 3, line 7, "sdeveral" should be --several--.

Col. 3, line 13, "sto" should be --to--.

Col. 3, line 27, "detailoed" should be --detailed--.

Col. 3, line 34, Claim 1, "claip" should be --clip--.

Col. 4, line 39, Claim 9, "form" should be --from--.

Col. 4, line 45, Claim 9, "emmber" (2nd occurrence) should be --member--.

Signed and Sealed this

Twenty-eighth Day of July, 1992

*Attest:*

DOUGLAS B. COMER

*Attesting Officer*      *Acting Commissioner of Patents and Trademarks*